June 16, 1931. F. C. COLLINS 1,810,345
TIRE DISPLAY STAND
Filed March 15, 1929 2 Sheets-Sheet 2
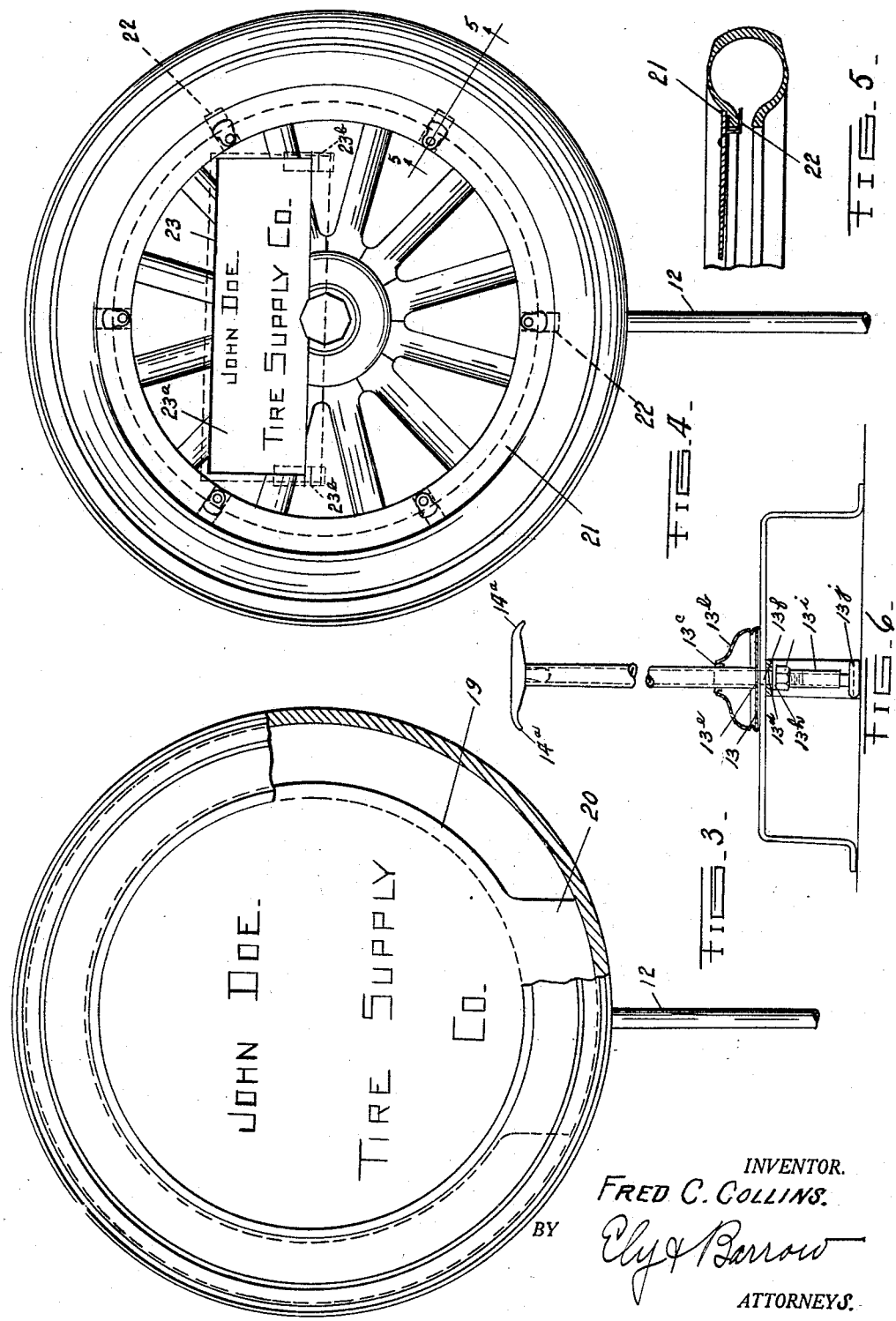
INVENTOR.
FRED C. COLLINS.
BY
ATTORNEYS.

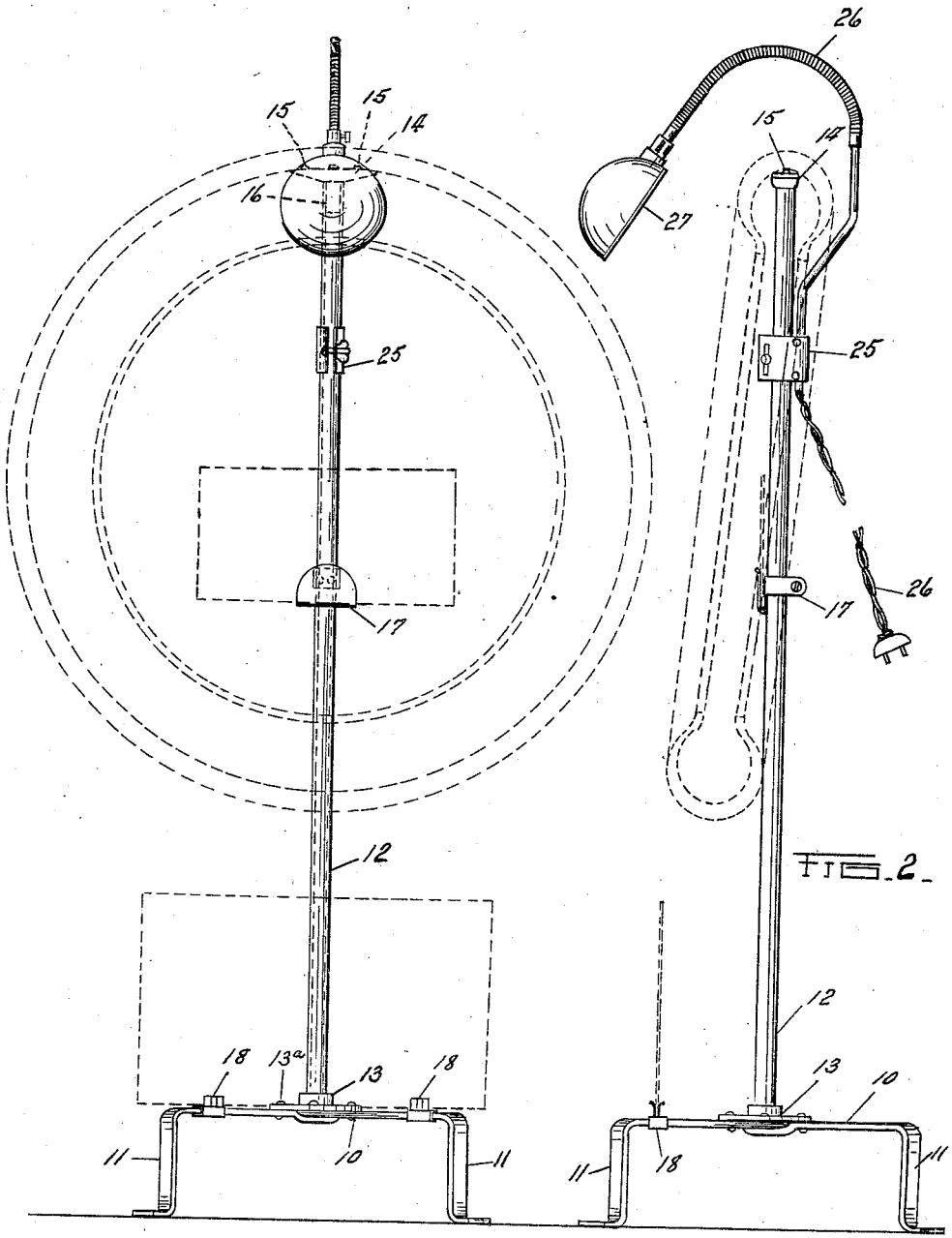

Patented June 16, 1931

1,810,345

UNITED STATES PATENT OFFICE

FRED C. COLLINS, OF AKRON, OHIO

TIRE DISPLAY STAND

Application filed March 15, 1929. Serial No. 347,307.

This invention relates to tire display stands.

The general purpose of the invention is to provide a tire display stand adapted to support a tire clear of the floor and free to be easily turned about for careful examination by a prospective purchaser, and also to provide display card devices for use in conjunction with said stand or tire.

The foregoing and other purposes or objects of the invention are attained in the devices described herein and illustrated in the accompanying drawings. It is to be understood that the invention is not limited to the particular form thereof shown and described.

Of the accompanying drawings,

Figure 1 is an elevation of a stand embodying the invention with a tire and display cards indicated in dotted lines thereon in front elevation;

Figure 2 is an elevation of the stand with the tire and display cards thereon indicated in dotted lines in side elevation;

Figure 3 is an elevation, partly in section, of a tire on a display stand embodying the invention and having a form of display card supported by the tire;

Figure 4 is a similar view with another form of display card;

Figure 5 is a section on line 5—5 of Figure 4; and

Figure 6 is an elevation, partly broken away and partly in section, showing the stand with a modified form of connection between the supporting spider and upright.

Referring to the drawings, the numeral 10 designates a supporting spider having legs 11, 11 extending downwardly from the outer ends of the spider arms and having an upright or standard 12 preferably of tubular or hollow formation supported centrally thereon as by means of a flange 13 secured on spider 10 by bolts 13ª. This provides a comparatively light but strong construction.

For very heavy service, a somewhat more effective mounting of the upright on the standard may be provided as shown in Figure 6. In this form, a hollow base 13ᵇ is apertured at 13ᶜ so that upright 10 may be passed therein and a bolt 13ᵈ is secured in the bottom end of the upright and passes through an aperture therefor at 13ᵉ in the bottom of base 13 and also through a central aperture 13ᶠ in spider 10. A nut 13ᵍ is threaded onto the bolt 13ᵈ against the under side of the spider, a lock washer 13ʰ being interposed between the nut and the under side of the spider. An auxiliary leg for the spider comprising a tube 13ⁱ threaded onto the lower end of bolt 13ᵈ and which may be provided with a foot pad 13ʲ of rubber or the like may be used with this type of mounting centrally to support the weight of very heavy tires.

On top of standard 12 there is provided a swiveled head 14 which is of generally rectangular shape or elongated in plan and its upper surface is of a more or less curvilinear formation lengthwise, especially at the tips 14ª, Figure 6, whereby it is adapted to receive and support tires of various sizes by engagement on the inside surfaces under the treads thereof without distortion of the tire. The upper surface of head 14 may be provided with bosses or projections indicated at 15, 15 for securing greater frictional resistance to displacement. Swiveling of head 14 on the standard 12 may be effected by provision of a stud 16 on the under side of head 14 retained in the upper end of the bore through the tubular standard 12.

The stand may be provided with a suitable clip 17 adjustable along upright 12 adapted as shown to support a display card in the "eye" or central opening of a tire mounted on said stand. Clips 18, 18 may also be adjustably mounted on adjacent arms of spider 10 to receive and support a display card shown in dotted lines thereon.

In Figure 3 a display card or disc 19 adapted to fit in the tire casing is shown, this card being of generally circular formation somewhat larger in diameter than the beads of the tire and having a supporting portion 20 on the bottom thereof for resting on the inside bottom surface of a tire mounted on said stand.

A very effective form of display disc or card which may be adapted to impart the impression of a tire mounted on a wheel is shown in Figure 4 for use on a tire mounted on the improved stand. The disc or card of this type herein shown at 21 is provided with a spoke wheel design and is slightly larger in diameter than the beads of a tire. It is mounted against the outside of the outer head on the stand by means of a circumferential series of clips 22, 22 pivotally mounted on the back of the card so as to engage about the outer bead as best shown in Figure 5. A space for advertising display or for receiving a separate display card may be provided at 23. As shown, a separate card 23ª is secured in back of a cut out space at 23 by means of clips 23ᵇ on the back of disc 21, clips 23ᵇ being similar to clips 22 but not pivoted. This type of display disc is advantageous in that it does not require flexure thereof to mount it in the tire and is, therefore, not bent or broken by repeated reuse on different tires.

As illustrated in Figure 2, a clamp 25 may be adjustably mounted on upright 12 and carrying a flexibly adjustable leads cable 26 for an electric light 27, cable 26 being adapted to be extended up from the rear of the stand over the tire to direct the light down upon the display as shown.

In use, the display stand supports the tire free of the floor by means of engagement of swivel head 14 against the inner surface under the tread of the casing suspending the tire so that its lower portion rests by gravity against standard 12. This manner of supporting the tire permits it to be rotated about its diameter between the point of support on the swivel and the part where it rests against the standard. It leaves the beads free for easy spreading to examine the inside of the casing and also facilitates shifting of the tire circumferentially on its support for this purpose. Since the center of gravity of the supported tire is quite close to the upright, there is no tendency for the stand to topple over.

It will be apparent from the foregoing that a simple, but effective display stand for tires has been provided by the invention. Obviously modifications of the invention may be resorted to without departing from the spirit thereof or the scope of the appended claim.

What is claimed is:

A tire display stand comprising a suitable base, an upright comprising a rod extending upwardly from said base, the upper end of said rod having an elongated head swiveled thereon adapted to receive a tire casing thereover with the interior of the casing under the tread resting upon said head, with said head extending circumferentially of the inside of a tire casing supported thereon, and said stand suspending the tire with an outer side of the tire at the lower portion thereof resting by gravity against the rod whereby the tire may be easily rotated about the diameter along which it is supported to any desired angular position respecting the stand.

FRED. C. COLLINS.